Patented June 8, 1948

2,442,952

UNITED STATES PATENT OFFICE 2,442,952

METHOD FOR PREPARING THE POTASSIUM SALT OF ORTHO-FORMOTOLUIDE

Garry C. Kitchens, Rutherford, N. J., assignor to Burton T. Bush, Inc., New York, N. Y., a corporation of New Jersey No Drawing. Application June 13, 1945, Serial No. 599,314

6 Claims. (Cl. 260—562)

This invention relates to a process for making the potassium salt of ortho-formotoluide. This substance is an intermediate in the preparation of indole, and consequently this invention also has application to the preparation of indole.

Indole, a chemical which was first prepared and established as the parent substance of indigo by Baeyer in 1886, is of considerable importance. Indole is an extremely important raw material to the perfumer, being an essential ingredient in many floral-type perfumes and oils, as well as serving as a starting material for other chemicals.

It is known that indole can be prepared with ortho formotoluide and metallic potassium as starting materials. An alcoholate of potassium is first prepared by treating a lower aliphatic alcohol, preferably tertiary butyl alcohol, with metallic potassium. The ortho formotoluide and potassium alcoholate are reacted to form potassium ortho formotoluide, which is then fused to yield the potassium salt of indole and ortho toluidine, the former then being hydrolyzed to form indole.

This known process, described in the Journal of the American Chemical Society, 63, 2024-5 (1941), furnishes indole of satisfactory purity. However, the process has serious disadvantages. It requires the use of a rather costly material, metallic potassium. Moreover, the alcoholate of potassium has to be prepared with special care, e. g., by conducting the reaction under a nitrogen gas atmosphere and by making suitable provisions to handle safely the gaseous hydrogen formed simultaneously with the alcoholate.

I have found a way to improve the known process so that it does not have the above-mentioned disadvantages. I accomplish this result by employing potassium hydroxide in place of metallic potassium. The cost and availability of potassium hydroxide are much more favorable commercially than they are in the case of metallic potassium. My improved process makes it unnecessary to prepare an alcoholate. As a result of my invention, the cost of making indole is reduced and a more simple practical process is therefore provided.

As will be understood by organic chemists skilled in the art, one could not have safely predicted in advance that the substitution of potassium hydroxide as the alkali-metal-containing ingredient would have resulted in an operable process. For one thing, the prior art itself recognized the specificity of the reaction. Thus, compounds such as sodium amide, sodium ethoxide, or methoxide or t-butoxide were found to be unsatisfactory. Moreover, organic chemists had long supposed that metallic potassium or sodium or their alcoholates or amides, were required to prepare the metallic salt of compounds of the class to which ortho formotoluide belongs.

In general, my improved process is carried out as set forth below. Potassium hydroxide and ortho formotoluide are caused to react with each other, preferably in the presence of a non-polar solvent. During the reaction, which is advantageously conducted at atmospheric pressure and, where possible, under reflux conditions, the water formed is continuously and automatically removed from the reaction vessel, according to known means. When the reaction is completed, or substantially completed, the non-polar solvent is distilled off, leaving the potassium salt of ortho formotoluide. This is a white crystalline solid having a melting point around 252° C. It is then heated to 340°–360° C. in an apparatus suitable for conducting distillation. The distillate, ortho toluidine, is recovered and may be used to form ortho formotoluide, which of course can then be processed as above. In addition to the ortho toluidine, gaseous products such as carbon monoxide are also evolved during the fusion.

The residue, which is the potassium salt of indole, may be treated in known manner to form indole.

It is believed that the following chemical equations set forth the reactions occurring in the practice of my improved process:

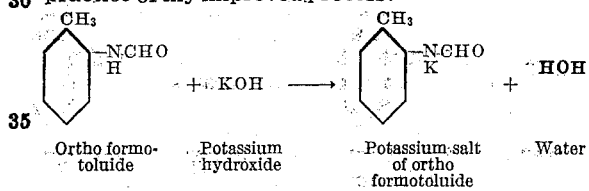

Ortho formo-   Potassium   Potassium salt   Water
toluide   hydroxide   of ortho
                            formotoluide

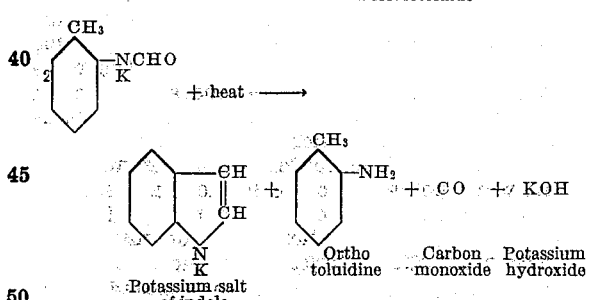

Potassium salt   Ortho   Carbon   Potassium
of indole   toluidine   monoxide   hydroxide

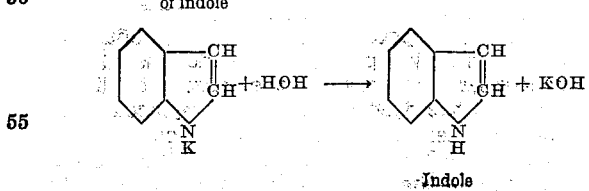

Indole

It was above stated that non-polar solvents were preferably employed in the reaction of potassium hydroxide and ortho formotoluide. Among those solvents which have been employed are benzene, toluene and the xylenes.

The relative amounts of potassium hydroxide and ortho formotoluide used in my process may vary. However, it is preferred to use equimolecular amounts, as these represent the theoretical amounts called for by the equation applying to the reaction. Nor is the process restricted to any particular amount of non-polar solvent. Enough of the solvent should be used so as to enable the formation of an azeotrope with the water reaction and to permit the separation and removal of the water prior to the return of the condensed solvent to the reaction chamber.

Still referring to the reaction of potassium hydroxide and ortho formotoluide, variations are possible also in the temperature, pressure and time of reaction. For example, I have conducted the reaction under reflux conditions at atmospheric pressure with benzene and metaxylene, or in other words, at temperatures between about 80° C. and about 140° C. As regards pressure, the reaction may be conducted under subatmospheric or superatmospheric conditions, if desired, but I prefer to employ atmospheric pressure. As will be understood by organic chemists, the time of reaction will vary according to the amounts of ingredients used and the temperature and pressure conditions employed. A suitable control is to run the reaction until all or substantially all the calculated amount of water of reaction has been formed and removed from the reaction chamber.

In order that my invention may be further described, I am setting forth an example illustrating the practice of my improved process.

*Example*

Place into a two liter, three neck flask fitted with a mechanical stirrer, dropping funnel and a reflux condenser equipped with a continuous water separator, 200 grams of benzene and 120 grams (2.02 moles) of potassium hydroxide (94%). The contents of the flask are vigorously agitated and now brought to a vigorous reflux by heating. A warm anhydrous solution of benzene and ortho formotoluide, previously prepared from 200 grams of benzene and 273 grams (2.02 moles) of ortho formotoluide (congealing point 56° C. or better), is fed in through the dropping funnel over a period of four hours under vigorous agitation and refluxing, continuously removing the water of the reaction as formed by separating it out of the distillate. The refluxing is continued until no more water is removed from the reaction. 38 grams of water are separated. This is slightly more than the expected theoretical quantity of water which increase is probably due to the slight moisture content of the ingredients. The white potassium ortho formotoluide salt begins to precipitate soon after the addition is started and the reaction mass becomes quite heavy with solid material at the end of the reaction. The potassium salt can be isolated by filtration or by removing the benzene by distillation.

For the preparation of indole, the reflux condenser is now replaced with a downward going condenser for removal of the benzene by distillation and the dropping funnel is replaced with a thermometer that extends near the bottom of the flask. The benzene is distilled off and the temperature of the contents gradually raised. When the temperature reaches 120° to 140° C. the mass becomes too thick for agitation and the stirrer is stopped. Heating is continued until the mass melts (about 250° C.) at which point the stirrer is cautiously started and heating of the liquid mass is continued until the decomposition of the potassium salt of formotoluide begins which reaction is indicated by the rapid distillation of toluidine and the evolution of gases. Normally the transition into the potassium salt of indole occurs within a temperature range of 340°–360° C. Local overheating or part heating can cause this reaction to begin at temperatures approximately 50° C. lower. In normal batches the temperature is held within the range of 340°–360° until no more toluidine distills. The contents of the flask are then allowed to cool and 420 grams of water are added, and the batch is subjected to steam distillation. The indole is extracted from the steam distillate with benzene. The solution of indole in benzene is worked up by distillation of the benzene. 60–65 grams of crude indole which contains some toluidine as an impurity are obtained. This crude indole, melting point about 50° C., yields 45–50 grams of pure indole, melting point 52°–53° C. after purification by distillation and crystallization from petroleum ether. 180 grams of toluidine is recovered in the process.

The foregoing illustrates the practice of this invention, which however, is not to be limited thereby but is to be construed as broadly as permissible in view of the prior art and limited solely by the appended claims.

I claim:

1. The process for making the potassium salt of ortho formotoluide, which comprises reacting ortho-formotoluide and potassium hydroxide in the presence of a non-polar liquid while removing the water formed during the reaction as it is formed by distilling off the azeotrope of water and said liquid.

2. The process for making the potassium salt of ortho formotoluide, which comprises reacting ortho formotoluide and potassium hydroxide in the presence of a liquid of aromatic hydrocarbon while removing the water formed during the reaction as it is formed by distilling off the azeotrope of water and said liquid.

3. The process for making the potassium salt of ortho formotoluide, which comprises reacting ortho formotoluide and potassium hydroxide in the presence of benzene while removing the water formed during the reaction as it is formed by distilling off the azeotrope of water and benzene.

4. The process for making the potassium salt of ortho formotoluide which comprises reacting substantially equimolecular quantities of ortho formotoluide and potassium hydroxide in the presence of a non-polar liquid under reflux conditions at atmospheric pressure while removing the water formed during the reaction as it is formed by distilling off the azeotrope of water and said liquid.

5. The process for making the potassium salt of ortho formotoluide which comprises reacting substantially equimolecular quantities of ortho formotoluide and potassium hydroxide in the presence of a liquid aromatic hydrocarbon under reflux conditions at atmospheric pressure while removing the water formed during the reaction as it is formed by distilling off the azeotrope of water and said liquid.

6. The process for making the potassium salt of ortho formotoluide which comprises reacting substantially equimolecular quantities of ortho formotoluide and potassium hydroxide in the presence of benzene under reflux conditions at atmospheric pressure while removing the water formed during the reaction as it is formed by distilling off the azeotrope of water and benzene.

GARRY C. KITCHENS.

REFERENCES CITED

The following references are of record in the file of this patent:

Organic Synthesis, vol. 23 (1943), pages 42-45.
Lucas-Organic Chemistry, American Book Co. New York (1935), pages 296-297.